US012761630B2

(12) United States Patent
Kiefer et al.

(10) Patent No.: US 12,761,630 B2
(45) Date of Patent: Oct. 13, 2026

(54) METHOD AND SYSTEM FOR USING DOMAIN KNOWLEDGE TO SYNCHRONIZE SIGNALS RELATED TO A MACHINE OR A MACHINING PROCESS

(71) Applicant: TRUMPF Werkzeugmaschinen SE + Co. KG, Ditzingen (DE)

(72) Inventors: Manuel Kiefer, Sinsheim (DE); Thomas Kieweler, Wimsheim (DE); Martin Lukas, Gerlingen (DE); Martin Schober, Gerlingen (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 546 days.

(21) Appl. No.: 17/840,644

(22) Filed: Jun. 15, 2022

(65) Prior Publication Data

US 2022/0308557 A1 Sep. 29, 2022

Related U.S. Application Data

(63) Continuation of application No. PCT/EP2020/087165, filed on Dec. 18, 2020.

(30) Foreign Application Priority Data

Dec. 20, 2019 (DE) ..................... 10 2019 135 493.5

(51) Int. Cl.
*G05B 19/4155* (2006.01)

(52) U.S. Cl.
CPC .................... *G05B 19/4155* (2013.01); *G05B 2219/34397* (2013.01)

(58) Field of Classification Search
CPC ...... G05B 19/4155; G05B 2219/34397; G05B 2219/37532; G05B 19/408
See application file for complete search history.

(56) References Cited

U.S. PATENT DOCUMENTS 5,365,787 A * 11/1994 Hernandez .............. G01H 1/10
73/660
6,427,099 B1 7/2002 Heinemann
(Continued)

FOREIGN PATENT DOCUMENTS

CN 1514209 A 7/2004
CN 101907089 A 12/2010
(Continued)

OTHER PUBLICATIONS

Editorial Department of "Metallurgical Equipment Management and Maintenance" Magazine, Modernization of Metallurgical Equipment Management, Oct. 1993, Shenyang: Northeastern University Press.

*Primary Examiner* — Robert E Fennema
*Assistant Examiner* — Marzia T Monty
(74) *Attorney, Agent, or Firm* — LEYDIG, VOIT & MAYER, LTD.

(57) ABSTRACT

A method for synchronizing signals which are related to a machine and/or a machining process, including recording data of a first data source to obtain a first signal track, recording data of at least one second data source, which is independent of the first data source, to obtain at least one second signal track, analyzing the first and second signal tracks based on previously known domain knowledge, and temporally connecting the first and second signal tracks.

20 Claims, 3 Drawing Sheets

(56) References Cited

U.S. PATENT DOCUMENTS

| | | | | |
|---|---|---|---|---|
| 2008/0000960 | A1* | 1/2008 | Outwater | G06Q 10/08 235/375 |
| 2012/0245712 | A1 | 9/2012 | Moehring et al. | |
| 2014/0166483 | A1* | 6/2014 | Chow | B03C 5/005 204/451 |
| 2014/0330122 | A1* | 11/2014 | Baghani | A61B 8/463 600/438 |
| 2016/0371137 | A1 | 12/2016 | Zhao et al. | |
| 2019/0033846 | A1* | 1/2019 | Cella | G05B 23/0291 |
| 2019/0041365 | A1* | 2/2019 | Zhuge | G01N 29/46 |
| 2019/0265363 | A1 | 8/2019 | Small | |
| 2021/0353149 | A1* | 11/2021 | Abbosh | G01N 22/00 |

FOREIGN PATENT DOCUMENTS

| | | | |
|---|---|---|---|
| CN | 103148162 | A | 6/2013 |
| CN | 106662654 | A | 5/2017 |
| CN | 109579915 | A | 4/2019 |
| DE | 102017210959 | A1 | 1/2019 |
| EP | 1312990 | A2 | 5/2003 |
| EP | 2434360 | A1 | 3/2012 |
| EP | 3051374 | A1 | 8/2016 |
| EP | 3336628 | A1 | 6/2018 |
| EP | 3521792 | A1 | 8/2019 |

* cited by examiner

METHOD AND SYSTEM FOR USING DOMAIN KNOWLEDGE TO SYNCHRONIZE SIGNALS RELATED TO A MACHINE OR A MACHINING PROCESS

CROSS REFERENCE TO RELATED APPLICATIONS

This application is a continuation of International Application No. PCT/EP2020/087165 (WO 2021/123265 A1), filed on Dec. 18, 2020, and claims benefit to German Patent Application No. DE 10 2019 135 493.5, filed on Dec. 20, 2019. The aforementioned applications are hereby incorporated by reference herein.

FIELD

The invention relates to a method and a system for synchronizing signals which are related to a technical system, in particular a machine and/or a machining process.

BACKGROUND

A high-precision temporal assignment of machine signals of internal and external sensor systems has not yet been possible. The current machine controllers and the machines themselves do not have an interface to enable superordinate signal processing with foreign signals.

EP 2 434 360 A1 discloses a method for movement control, wherein a first movement controller is connected to a second movement controller via a data bus, wherein first trace data of the first movement controller have a time stamp dependent on a global time and wherein second trace data of the second movement controller have a time stamp dependent on the global time, wherein the different trace data are linked by means of the time stamp.

Provision is thus made in the prior art to acquire data in a time-synchronized manner in order to be able to assign said data to one another later.

SUMMARY

In an embodiment, the present disclosure provides a method for synchronizing signals which are related to a machine and/or a machining process, comprising recording data of a first data source to obtain a first signal track, recording data of at least one second data source, which is independent of the first data source, to obtain at least one second signal track, analyzing the first and second signal tracks based on previously known domain knowledge, and temporally connecting the first and second signal tracks.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
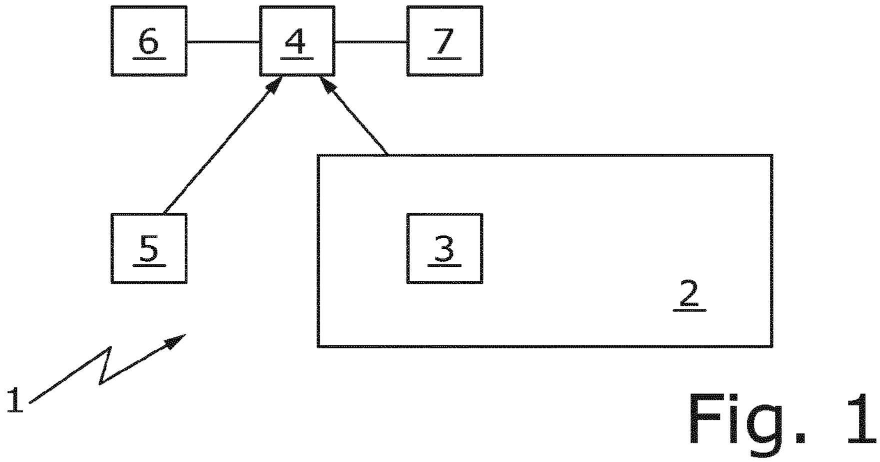
FIG. 1 shows a schematic representation of a system.

In an embodiment, the present invention provides a method and a system using signal tracks of different data sources which are independent of one another and not temporally synchronized which can be correlated in terms of time.

In an embodiment, a method is provided for synchronizing signals which are related to a technical system, in particular a machine and/or a machining process, comprising the following method steps:

a) recording data of a first data source in order to obtain a first signal track, b) recording data of at least one second data source, which is independent of the first data source, in order to obtain at least one second signal track, c) analyzing the signal tracks based on previously known domain knowledge, d) temporally connecting the signal tracks.

Data sources within the context of embodiments the invention may be for example measurement sources, sensors, controllers, etc. The recorded data may be measured data, that is to say measurement data. Furthermore, the data may be input variables or output variables of controllers. Drives of a machine may also constitute data sources. The data may accordingly be data of a drive. The data are recorded in a manner dependent on time. When the data are transmitted, they are transmitted as signals. The time profile of a signal is denoted as signal track or trace.

Domain knowledge globally describes the relationship of vibration excitation by machine components, axis dynamics, absolute position of the kinematic chain, possibly on the basis of the working area, actuators, for example valves, the operating state of a machining unit and noise emissions (sound waves). A laser, a punching apparatus, a press, a milling head, a saw, a drill and a water jet are possible, for example, as the machining unit. In machine tools, the machining units are moved in a particular axial direction via drives and possibly mechanical components connected in between, such as gears or gantries. This is often referred to in short form as an axis. All components, in particular axes, which contribute to a movement of a machining unit are called a kinematic chain. Furthermore, the domain knowledge includes the relationship between individual components, in particular the infrastructure, movement trajectories, machining processes and properties of all components involved.

When the signal tracks are temporally connected, the signal tracks can be temporally synchronized. In particular, the signal tracks can be assigned to a common time axis. In this way, faulty machine states, in particular slowly advancing defects, can be identified at an early stage. Furthermore, noise not originating from the machine or the axes can be suppressed. This improves the signal-to-noise ratio.

Even in the case of two different but expediently selected signal tracks, it is possible to clearly ascertain a temporal synchronicity from the previously mentioned domain knowledge. The more different signal tracks are available, the more reliable the analysis. Using the method according to an embodiment of the invention, synchronization in real time is conceivable, such that real-time evaluations on the basis of different data sources are possible. There are therefore new options for fault detection, fault diagnosis, state monitoring and predictive maintenance of overall systems. In particular, real-time fault diagnosis of overall systems is possible using differently running clocks. Interference sources can be suppressed based on known and expected signal patterns. The machining quality can be improved. False alarms and erroneous fault interpretations can be reduced. The method according to an embodiment of the invention can be implemented in a low-outlay and cost-effective manner since no additional outlay for time synchronization has to be operated. Furthermore, the method according to an embodiment of the invention can be scaled since it can be used for two and more different data sources. A system-wide use is also possible through cascading. Entire production plants or factory halls can therefore be diagnosed.

The signal tracks can be analyzed in a manner based on models. In particular, data values from signal tracks of different data sources can be assigned in terms of time in automated fashion based on domain knowledge in a manner based on models. Deviations, for example of sound pressure, ordinal numbers or mechanical resonances, lead to rapid fault detection, accurate fault identification and efficient fault elimination.

The signal tracks can be analyzed in particular by means of pattern recognition based on reference patterns. The reference patterns are known from the domain knowledge. By means of pattern recognition and pattern comparison, it is possible to overlap signal tracks from different data sources, in particular measurement sources, in terms of time. For example, the kinematic chain produces a known excitation pattern according to the movement profile of the actuators/axes. This excitation pattern can be found translated in various data recordings, in particular measurement recordings. In addition, mechanical resonance points of a machine can be excited, which are likewise shown in known vibration phenomena.

Particular advantages result when the signal tracks are recorded without the recordings being synchronized in terms of time. It is therefore not necessary to provide the signal tracks with a time stamp, as in the prior art.

At least one signal track of a data source inside the machine and at least one signal track of a data source outside the machine can be used. A data source inside the machine may be for example a controller inside the machine or a drive inside the machine. A data source outside the machine may be for example a camera or microphone using which the process which is performed on the machine is observed. When data sources inside and outside the machine are used, the diagnosis of a system and in particular the fault identification can be improved and simplified.

The periods in which the data of the data sources are recorded preferably overlap. It is therefore possible to harmonize the recorded signal tracks in terms of time and in particular to synchronize them after the analysis.

After the signal tracks have been synchronized, a time-frequency transformation, for example a Fourier transformation, can be carried out. The analysis and fault finding can therefore be simplified.

In order to improve the analysis result, provision is made for each signal track to comprise at least a predetermined number of data points. This number may depend on the frequency at which data points are detected. This may differ by many orders of magnitude. An NC controller controls in the millisecond range; the interpolation of the NC controller is even quicker. This is the frequency at which for example drives are activated, for example the motor current is adjusted in a regulation process in order to achieve a target speed. This would thus be around 1 kHz. Optical or acoustic sensors can measure in a wide frequency band. A camera, for example in the order of magnitude of 10 or 100 Hz, can possibly measure even higher for special applications. Photodiodes measure in the range of MHz or even GHz. Acoustic sensors resolve for example in the audible range, that is to say in the kHz range; however, there are also sensors in the MHz or GHz range. Two traces can therefore be connected to one another when a characteristic signal from the data sources involved can also be resolved and a corresponding number of measurement points has been recorded (depending on the measuring frequency or recording frequency).

The technical system, in particular the first or second data source, and thus the recorded data can be manipulated in a targeted manner, in particular mechanical resonance points can be excited in a targeted manner. Input variables, for example from controllers, can be manipulated in a targeted manner. When input variables are manipulated in a targeted manner, a specific result or behavior in the recorded data is expected. It is then possible to analyze whether the recorded signal exhibits the expected behavior. Based on this analysis, it is possible to infer possible fault sources.

Each data recording can be time-normalized per se and contain the Nyquist criterion. In this way, the reliability of the analysis can be improved.

Based on the analyzed signal tracks, it is possible to carry out fault identification, fault diagnosis, state monitoring and/or predictive maintenance.

Applications for the method according to an embodiment of the invention are for example machine diagnosis, such as for example axis diagnosis, process diagnosis and diagnosis of other, external causes. Embodiments of the invention permit evaluation of aggregated and correlating data sources for early identification of imminent faults.

Also falling within the scope of the invention is a system for synchronizing signals, comprising a first data source which delivers a first signal track and a second data source which delivers a second signal track, an analysis device to which the signal tracks are fed and which is connected to a storage device or comprises same, in which storage device domain knowledge is stored, wherein the analysis device is set up to temporally connect the signal tracks based on the stored domain knowledge. Such a system can be used to temporally synchronize signal tracks which originate from different data sources and which do not have a time stamp. It is therefore possible to analyze the system and where necessary identify faults. At least one data source is preferably arranged inside the machine and at least one data source is preferably arranged outside the machine.

Further features and advantages of the invention are evident from the following description of exemplary embodiments of the invention, with reference to the figures of the drawing, which shows details essential to the invention, and from the claims. The features shown here are to be understood as not necessarily to scale and are illustrated in such a way that the characteristic features according to the invention can be made significantly more visible. The various features can be realized in each case individually by themselves or as a plurality in any desired combinations in variants of the invention.

The schematic drawing illustrates exemplary embodiments of the invention and these are explained in more detail in the description which follows.

FIG. 1 shows a system 1 for synchronizing signals. A machining process is carried out on a machine 2. The machine 2 has a first data source 3. The first data source 3 may be for example a controller of the machine 2. In particular, it may be a data source inside the machine. Data of the data source 3 are recorded and transmitted to an analysis device 4 as a signal track. The analysis device 4 may be arranged inside or outside the machine.

In the exemplary embodiment shown, a further second data source 5 is arranged outside the machine. For example, the second data source 5 may be a microphone or a camera. The data of the data source 5 are likewise recorded and likewise transmitted to the analysis device 4 as a signal track. The data recording of the data of the data sources 3 and 5 is carried out independently of one another. In particular, it is carried out without a synchronized time stamp of the data sources 3, 5 with the analysis device 4 and with one another.

What is known as domain knowledge is stored in the memory 6. Said domain knowledge may be previously recorded measurement data, simulation results, historical data of the machine 2 itself, data from other machines, etc. The analysis device 4 can access the domain knowledge. The signal tracks of the data sources 3, 5 are analyzed based on the domain knowledge and temporally connected to one another. The result can be displayed on a display device 7.

Figure 2A:
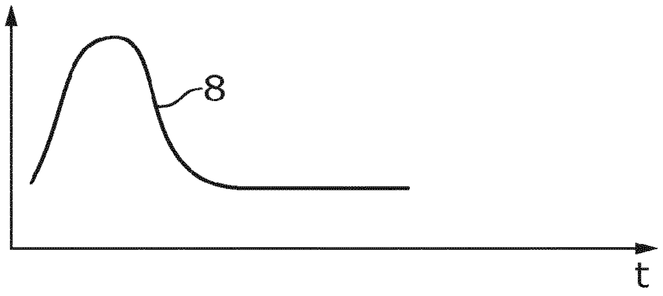
FIGS. 2*a* to 2*c* show graphs for explaining the signal synchronization.
Figure 2B:
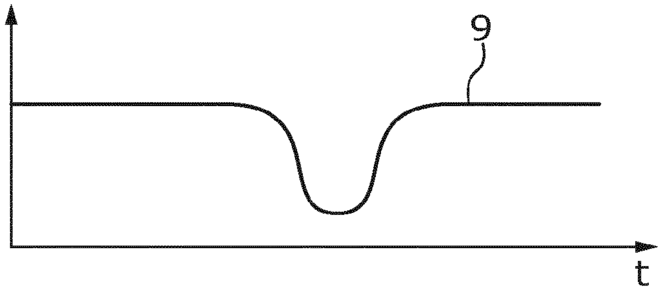
Figure 2C:
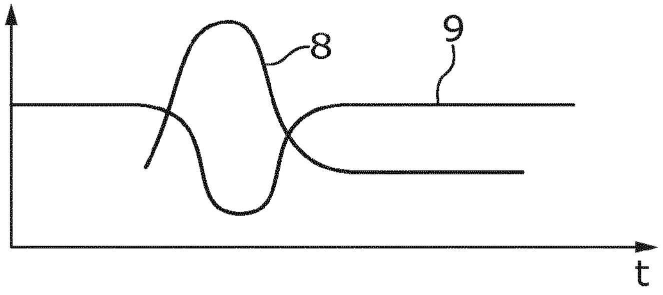

FIG. 2*a* shows the signal track 8 which corresponds to the recorded data of the data source 3. FIG. 2*b* shows the signal track 9 which corresponds to the recorded data of the data source 5. In domain knowledge, it is known that the signal track 8 can be seen as a reaction to a specific excitation signal. In domain knowledge, it is also known that the signal track 9 can be expected as a reaction to the same excitation signal. The temporal relation between the signal tracks 8 and 9 and the excitation signal is also known. Based on this knowledge, the signal tracks 8 and 9 can be related to one another in terms of time, which is illustrated in FIG. 2*c*. The signal tracks 8 and 9 are illustrated here so that they are assigned to a common time axis.

Figure 3A:
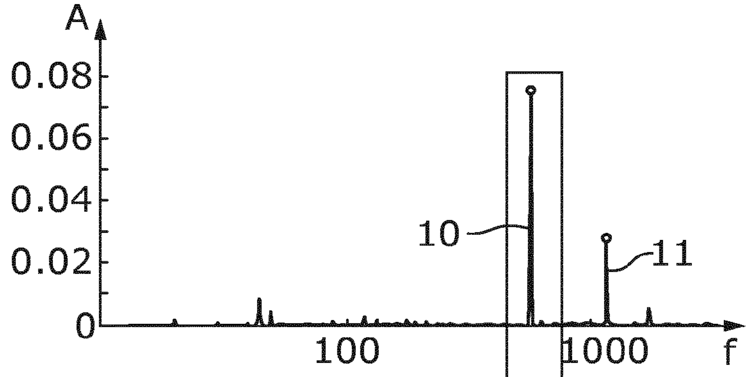
FIGS. 3*a* to 3*c* show graphs for explaining the fault identification.
Figure 3B:
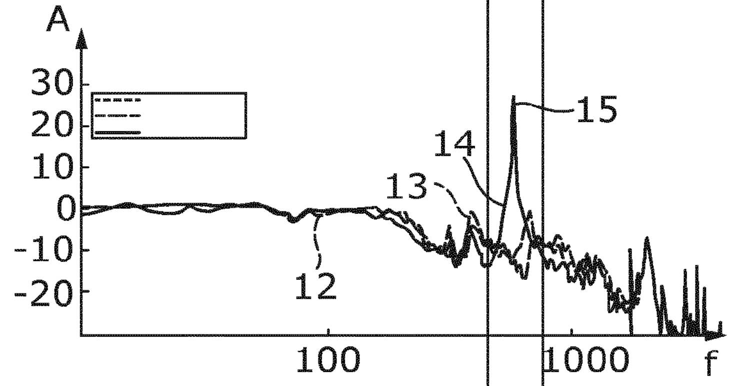
Figure 3C:
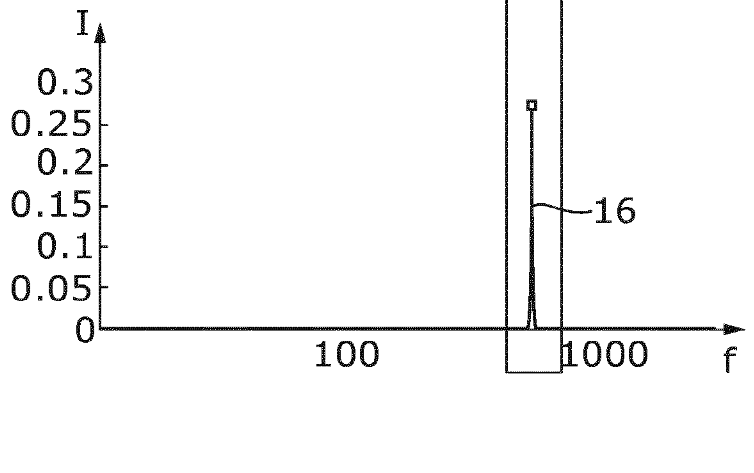

The method according to an embodiment of the invention is intended to be explained based on FIGS. 3*a* to 3*c*. Interference in a machine has been recorded by an external data source, in particular a microphone. FIG. 3*a* illustrates the spectral analysis of the interference, with the amplitude being plotted against the frequency. The spectral analysis has been produced after the interference signal has first been related in terms of time to other signal tracks and a Fourier transformation has been carried out. The first harmonic 10 is shown at the frequency 566.4 Hz. The second harmonic 11 is shown at the frequency 1132.9 Hz.

FIG. 3*b* shows the reference frequency response of a speed control circuit of the Z axis of a machine, with the amplitude being plotted against the frequency. The curve 12 represents the reference frequency response of a first start-up. The curve 13 represents the reference frequency response of a second start-up, for example at a customer. The curves 12, 13 have a similar shape and do not exhibit any abnormalities. The curve 14 corresponds to a reference frequency response, which has been recorded as second signal track, as the interference showed. The curve 14 has been ascertained by the second signal track being synchronized with the interference first and then being subjected to Fourier transformation. A peak 15 can be identified at the frequency 566.4 Hz. This means that an abnormality in the Z axis has been determined at a frequency which corresponds to the first harmonic 10 of the interference. The second harmonic 11 does not correlate with the frequency response of the Z axis and therefore has another cause.

In FIG. 3*c*, the torque-forming current (current which is responsible for forming the torque of the drive) is plotted against the frequency. The torque-forming current of the Z axis likewise has a peak 16 at the frequency 566.4 Hz. It is thus possible to confirm a fault in the Z axis.

As a result of the fact that the signal tracks were initially related to one another in terms of time, it was possible to harmonize the spectra ascertained from the signal tracks. No peak at the frequency 566.4 Hz has been ascertained in the torque-forming currents of the other axes. It was thus possible to exclude the fact that the fault which caused the interference was caused by one of the other axes. On account of the domain knowledge, it is known where peaks at certain frequencies originate. It is therefore possible to ascertain where a fault is present and to eliminate this in a targeted manner on account of the signal tracks recorded.

Figure 4:
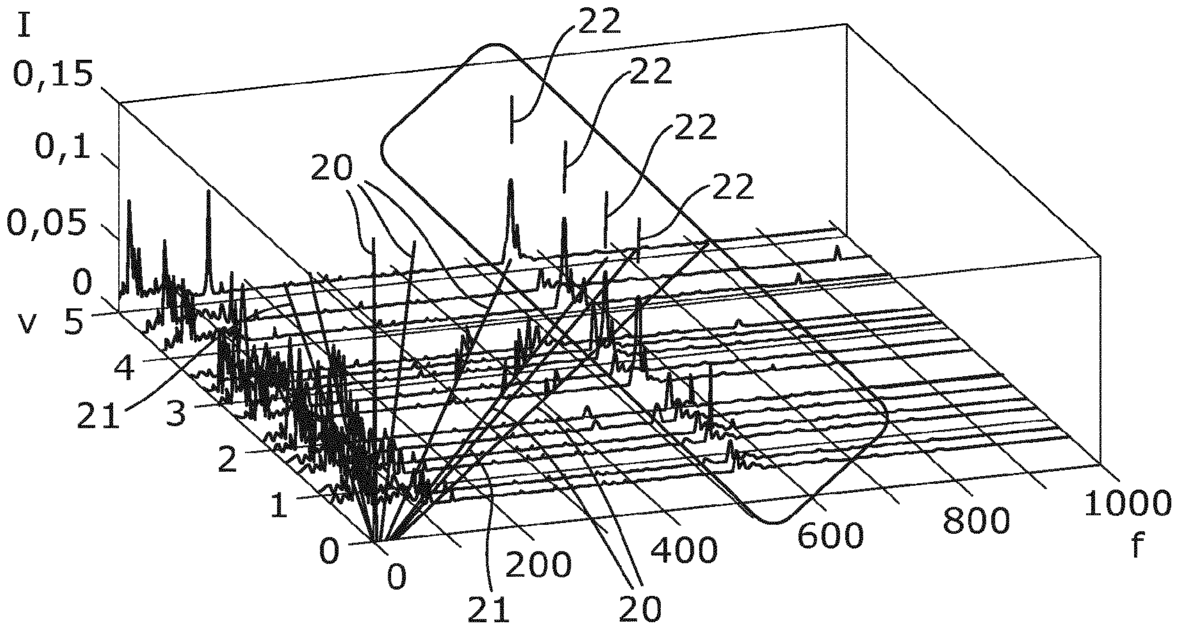
FIG. 4 shows another graph for explaining the fault identification.

The graph of FIG. 4 illustrates the spectrum of the torque-forming current of an X axis. In the plane, the speed v is plotted against the frequency f. The vertical axis shows the amplitude of the torque-forming current. The excitation (harmonic) through the toothed engagement of the pinion and toothed rack is shown along the lines 20. The excitations through a motor are shown along the lines 21. The lines 22 show overlapping of sound levels. Sharp peaks can be seen at a constant frequency of in this case approximately 550 Hz. These indicate mechanical resonance points. The overlapping of sound levels makes it possible to make a statement about the severity and the extent of the vibrations.

It can be seen here that the signal tracks on account of excitations through the motor and on account of excitations on account of a toothed engagement of the pinion and toothed rack and also signal tracks which have been recorded by means of a microphone have been related to one another in terms of time in order to obtain information about the behavior of the machine. It can be seen that resonances arise at 550 Hz for different speeds of the X axis. This suggests that the resonances are attributed to a structural element of the machine and not to the drive (motor).

Figure 5:
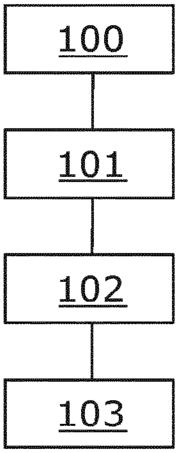
FIG. 5 shows a flow diagram for explaining an embodiment of the method according to the invention.

In the flow diagram of FIG. 5, the step of recording data of a first data source in order to obtain a first signal track is denoted by 100. In step 101, data of a further data source are recorded, with the further data source being independent of the first data source. A second signal track is obtained as a result. In step 102, the signal tracks are analyzed based on known domain knowledge. In step 103, the signal tracks are temporally connected to one another. There may be a further step in which the temporally synchronized signal tracks are transformed into the frequency range and the result is analyzed (in automated fashion). This analysis can also be carried out with the aid of or with support from domain knowledge.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for synchronizing signal tracks recording temporal data from data sources, the signal tracks being related to a machine or a machining process performed using the machine, the method comprising:

recording data of a first data source to obtain a first signal track;

recording data of a second data source, which is independent of the first data source, to obtain a second signal track;

manipulating the machine by physically exciting a mechanical resonance point of the machine in a manner targeted to translate into an expected result in the first signal track and the second signal track;

analyzing the first signal track and the second signal track based on previously known domain knowledge to determine a temporal synchronicity between the first signal track and the second signal track, the previously known domain knowledge comprising data for recognizing the expected result of exciting the mechanical resonance point in the manner targeted; and temporally connecting the first signal track and the second signal track based on the determined temporal synchronicity.

2. The method as claimed in claim 1, wherein temporally connecting the first signal track and the second signal track comprises assigning the first signal track and the second signal track to a common time axis.

3. The method as claimed in claim 1, wherein the previously known domain knowledge comprises models, and wherein the analyzing of the first signal track and the second signal track is performed based on the models.

4. The method as claimed in claim 1, wherein the previously known domain knowledge comprises reference patterns, wherein the analyzing of the first signal track and the second signal track comprises performing pattern recognition based on the reference patterns.

5. The method as claimed in claim 1, wherein the first signal track and the second signal track are recorded without temporally synchronizing data recordings of the first data source and the second data sources.

6. The method of claim 5, wherein neither of the first signal track nor the second signal track comprise a time stamp.

7. The method as claimed in claim 1, wherein the first data source is inside the machine and the second data source is outside the machine.

8. The method as claimed in claim 1, wherein a period in which the data of the first data source is recorded overlaps with a period in which the data of the second data source is recorded.

9. The method as claimed in claim 1, wherein each of the first signal track and the second signal track comprises a predetermined number of data points.

10. The method as claimed in claim 1, wherein the recorded data of each of the first data source and the second data source is time-normalized per se and contains Nyquist criterion.

11. The method as claimed in claim 1, the method further comprising carrying out a fault identification, fault diagnosis, state monitoring, or predictive maintenance by analyzing the temporally connected first signal track and second signal track.

12. The method of claim 1, wherein the previously known domain knowledge further comprises: knowledge correlating a relationship between individual components of the machine or used in the machining process, which comprises a relationship of a vibration excitation by machine components, axis dynamics, or an absolute position of a kinematic chain; the machining process; properties of components used in the machining process; reference patterns comprising expected patterns in the first signal track or the second signal track from a known excitation, the known excitation comprising the exciting of the mechanical resonance point or an excitation signal, which comprises an input variable manipulation; previously recorded measurement data; simulation results from a model, historical data of the machine or from other machines; or a temporal relation between the known excitation and the first signal track or the second signal track.

13. The method of claim 1, wherein analyzing the first signal track and the second signal track based on previously known domain knowledge to determine the temporal synchronicity between the first signal track and the second signal track comprises analyzing the first signal track and the second signal track based on the data for recognizing the expected result of exciting the mechanical resonance point in the manner targeted, a known temporal relation between the first signal track and the excitation of the mechanical resonance point, and a known temporal relation between the second signal track and the excitation of the mechanical resonance point to assign the first signal track and the second signal track to a common time axis.

14. The method of claim 1, wherein after the first signal track and the second signal track are temporally connected to generate temporally connected signal tracks, the method further comprises carrying out a fault identification, a fault diagnosis, state monitoring, a predictive maintenance analysis by analyzing the temporally connected signal tracks in real-time.

15. The method of claim 1, wherein after the first signal track and the second signal track are temporally connected to generate temporally connected signal tracks, the method further comprises analyzing the temporally connected signal tracks based on the domain knowledge.

16. The method of claim 15, wherein analyzing the temporally connected signal tracks based on the domain knowledge comprises analyzing whether the expected result of exciting the mechanical resonance point in the manner targeted is recognized in the first signal track and the second signal track to determine a possible fault source.

17. The method of claim 1, wherein analyzing the first signal track and the second signal track based on previously known domain knowledge to determine the temporal synchronicity between the first signal track and the second signal track comprises analyzing the first signal track and the second signal track based on the data for recognizing the expected result of exciting the mechanical resonance point in the manner targeted, a known temporal relation between the first signal track and the excitation of the mechanical resonance point, and a known temporal relation between the second signal track and the excitation of the mechanical resonance point to assign the first signal track and the second signal track to a common time axis, wherein after the first signal track and the second signal track are temporally connected to generate temporally connected signal tracks, the method further comprises performing a time-frequency transformation on the temporally connected signal tracks to generate transformed signal tracks having harmonized spectra; carrying out a fault identification by analyzing the transformed signal tracks in view of the domain knowledge to determine where a fault is present; and eliminating the fault.

18. A system for synchronizing signal tracks recording temporal data from data sources, the system comprising:

an analysis device comprising a processor configured to execute a method for synchronizing the signal tracks and memory storing previously obtained domain knowledge, which are related to a machine or a machining process performed using the machine, the method comprising:

recording data of a first data source to obtain a first signal track;

recording data of a second data source, which is independent of the first data source, to obtain a second signal track;

manipulate the first data source or second data source to physically excite a mechanical resonance point of the machine in a manner targeted to translate into an expected result in the first signal track and the second signal track;

analyzing, using the processor, the first signal track and the second signal track based on the previously obtained domain knowledge to determine a temporal synchronicity between the first signal track and the second signal track, the previously known domain knowledge comprising data for recognizing the expected result of exciting the mechanical resonance point in the manner targeted; and temporally connecting the first signal track and the second signal track based on the determined temporal synchronicity.

19. The system as claimed in claim 18, wherein the first data source is arranged inside the machine and the second data source is arranged outside the machine, wherein the first data source comprises a sensor, a controller, or a drive of the machine, and wherein the second data source comprises a sensor, a controller, a camera, or a microphone.

20. A method for operating a machine, the method comprising:

performing a machining process by controlling the machine based on a first data source, the first data source comprising input variables or output variables of a controller;

while performing the machine process:

recording data of the first data source to obtain a first signal track, recording data of a second data source, which is independent of the first data source, to obtain a second signal track, and physically exciting a mechanical resonance point of the machine in a manner targeted to translate into an expected result in the second signal track by manipulating the first data source;

analyzing the first signal track and the second signal track based on previously known domain knowledge to determine a temporal synchronicity between the first signal track and the second signal track, the previously known domain knowledge comprising data for recognizing the expected result of exciting the mechanical resonance point in the manner targeted; and temporally connecting the first signal track and the second signal track based on the determined temporal synchronicity such that the first signal track and the second signal tracks are synchronized.

* * * * *